No. 795,316. PATENTED JULY 25, 1905.
B. R. STARE.
BRAKE MECHANISM FOR TRUCKS.
APPLICATION FILED NOV. 16, 1901.
2 SHEETS—SHEET 1.
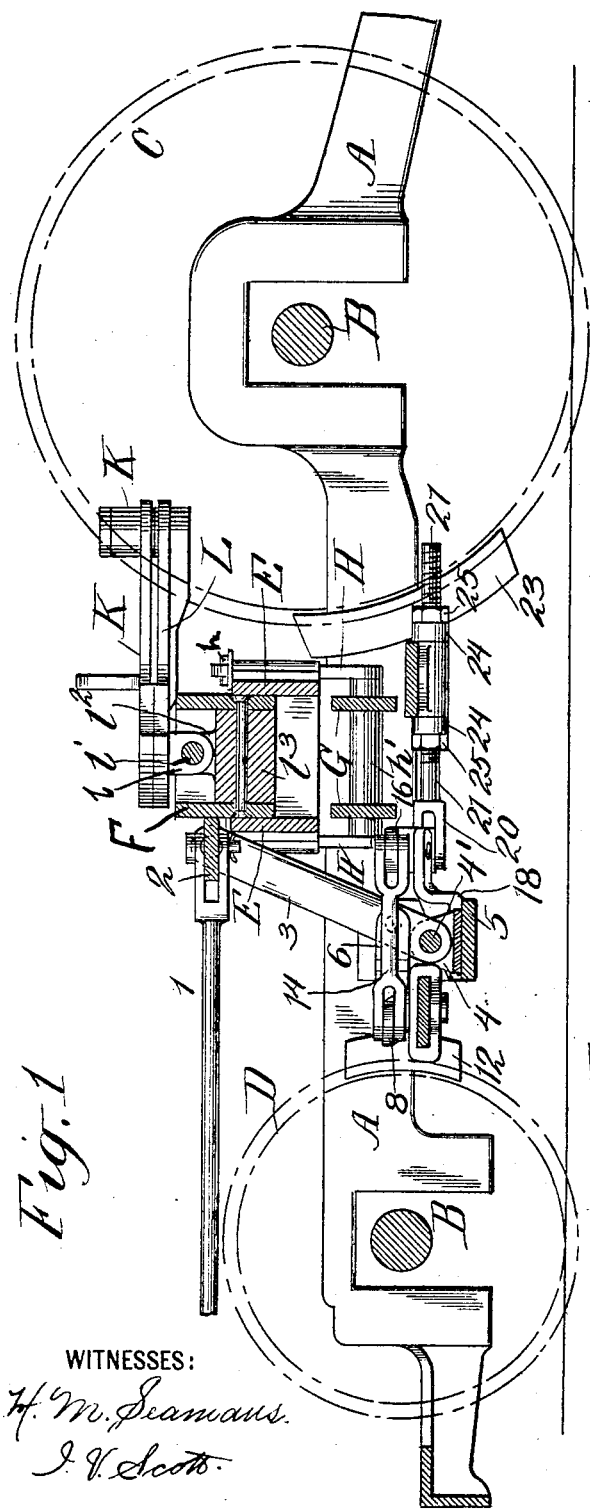
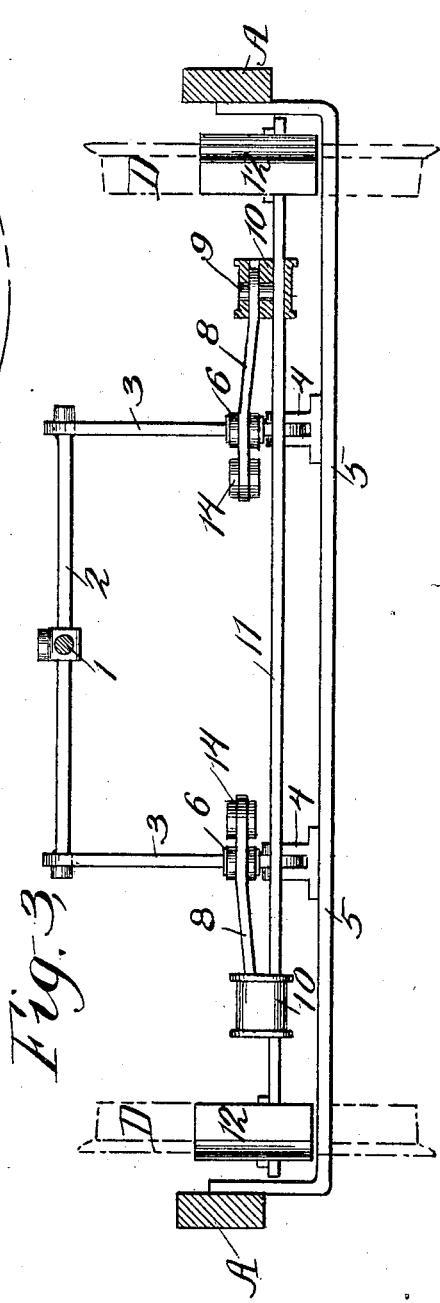
WITNESSES:
INVENTOR
BY
ATTORNEYS

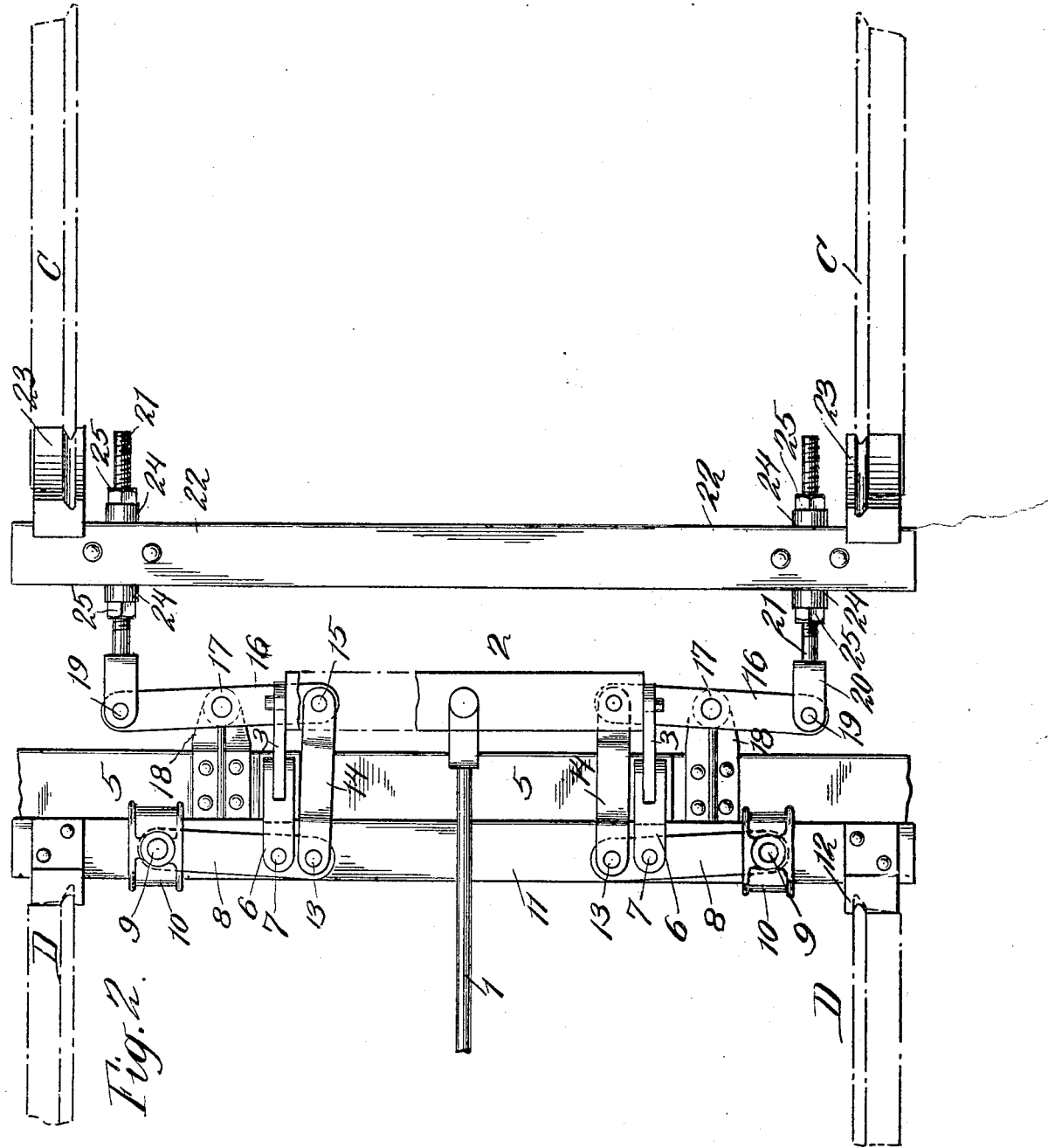

UNITED STATES PATENT OFFICE.

BURTON R. STARE, OF KINGSTON, NEW YORK, ASSIGNOR TO PECKHAM MANUFACTURING COMPANY, OF NEW YORK, N. Y., A CORPORATION OF NEW YORK.

BRAKE MECHANISM FOR TRUCKS.

No. 795,316. Specification of Letters Patent. Patented July 25, 1905.

Application filed November 16, 1901. Serial No. 82,506.

*To all whom it may concern:*

Be it known that I, BURTON R. STARE, residing at Kingston, in the county of Ulster and State of New York, have invented certain new and useful Improvements in Brake Mechanism for Trucks, of which the following is a full, clear, and exact description, such as will enable others skilled in the art to which it appertains to make and use the same.

This invention relates to brake mechanism for trucks, and is especially adapted for use with maximum-traction trucks or trucks adapted to be carried in pairs under the car-body, in which the load is unequally divided between the different sets of wheels.

The object of the invention is to provide an improved means whereby the braking pressure may be properly proportioned between the wheels of such truck—that is, may be so proportioned that the wheels which carry the greater part of the load may receive the greater braking pressure.

To this end the invention consists in the features of construction, combinations of elements, and arrangement of parts, as will be more specifically set forth hereinafter and the novel features thereof defined in the claims at the end of this specification.

The invention will be understood by reference to the embodiment thereof shown in the accompanying drawings, in which—

Figure 1 is a longitudinal vertical sectional view showing conventionally the wheels, side frame, and car-body supports of a truck with my improved brake mechanism applied thereto. Fig. 2 is a top plan showing in detail the various parts of the brake mechanism, other parts of the truck being omitted for the sake of clearness of illustration. Fig. 3 is a detail showing the brake mechanism in end elevation looking from the right of Fig. 2 with certain parts in section.

Similar reference characters refer to similar parts throughout the several views.

In the drawings I have shown my invention as applied to a four-wheel truck of the maximum-traction type, having two large and two small wheels, with the large wheels leading. It will be understood, however, that I am not limited to this specific type of truck, as my invention is applicable to various types of trucks in which it may be desirable to provide means for obtaining a differential braking pressure or a braking pressure which is divided unequally. It will also be seen that there are specific advantages in the present form of brake mechanism (applicable both to trucks wherein it is desired to divide the braking pressure differentially between the wheels and also to those wherein braking pressure is not so divided) in that the various levers by which the braking pressure is applied are for the most part arranged in substantially horizontal planes in such manner that they do not interfere with the other parts of the complete truck and motor equipment. By "horizontal plane" is meant that the levers with reference to the truck-frame extend transversely from their pivotal points rather than above and below. Obviously this could be provided for in the case of levers formed of bars such as those shown in the present illustration by pivoting them either upon vertical or transverse pivot-pins. In either event they would be distinguished from levers which extend above or below their pivotal points whether in a vertical or inclined plane.

Referring first to Fig. 1, the side frame of the truck is represented at A. B B are the axles carrying the large wheels C and small wheels D. Transoms E are properly supported upon the side frames, and between said transoms is guided bolster F, which may be supported in any desired way, as upon elliptic and spiral springs. (Not shown.) A spring-plank composed of two spaced bars G is carried by links H at each side of the truck, which links are supported at their upper ends by pins $h$, resting in sockets in connection with the transoms, and at their lower ends provide bearings for a pin which passes through a sleeve $h'$ in connection with the two bars of the spring-plank. Upper swivel-plate K pivots about the king-pin $k$. Lower swivel-plate L, through which the king-pin passes, is hingedly mounted with respect to the bolster by lugs $l$ depending therefrom, in which is loosely journaled transverse pin $l'$, which in turn is supported by lugs or ears $l^2$ upon a casting $l^3$, riveted within the bolster. These parts are only shown at one end of the bolster; but they are all of known construction, and inasmuch as they are only illustrated in explanation of the essential features of my invention it is thought that such illustration is sufficient.

Brake-rod 1, which may be actuated in any suitable way, is connected substantially at the center of a transverse bar 2, at each end of which is pivotally connected downwardly-extending levers 3. Inasmuch as the brake mechanisms at each side of the truck, which are actuated through brake-rod 1 and bar 2, are duplicates, the description of such mechanism on one side of the truck will suffice for both. Lever 3 is pivoted in brackets or supports 4 on a pin 4'. Brackets 4 are carried on cross-beam 5, rigidly secured at its ends to the side bars, as indicated in Fig. 3. This cross-beam provides a rigid support on which the various moving levers of the brake mechanism are fulcrumed. Near the lower end of the lever 3 is pivotally connected a clevis or coupling 6, which is bifurcated vertically to embrace said lever 3 at one end and transversely at the other end to embrace the lever 8, which is pivoted thereto between its center and its inner end by the pin 7. Said lever 8 is pivotally mounted at its outer end upon the pin 9 within clip 10, which is secured in any desirable manner to the brake-beam 11, which carries the brake-shoes 12 for the smaller set of wheels. The construction illustrated is one in which the brake-shoes are hung upon the inside of the wheels, forming what is known as an "inside" brake-rigging; but it will be understood that with slight changes the invention might be adapted to an outside brake-rigging. At the inner end of lever 8, by means of pin 13, is pivotally mounted the bifurcated end of lever 14, the other bifurcated end of which is pivotally connected by the pin 15 to the end of the lever 16, which is pivoted at 17 to a bracket 18, secured to the rigid cross-beam 5 and extending toward the side of the larger wheels. To the outer end of lever 16 by the pin 19 is pivotally connected clip 20, to which is connected the rod 21, which passes through brake-beam 22, carrying the brake-shoes 23 for the large wheels. This connecting-rod 21 is screw-threaded throughout a portion of its length and is adjustably secured in position in connection with the brake-beam 22 by washers 24 and nuts 25, located on said threaded rod on each side of the brake-beam.

It will be understood from the above description that a pull upon bar 2 through the brake-rod 1 will throw the levers 3, extending downwardly therefrom at each end, and these levers through the connecting clevis or coupling 6 and the various connecting-levers will throw both brake-beams 11 and 22 in order to set the brake-shoes against the wheels. It is immaterial whether the action of the two brake-beams is defined as taking place simultaneously or in succession. The action of the said brake mechanism will be practically to set all the brake-shoes at the same time. Any desired ratio of braking pressure between the large and small wheels may be obtained by proper positioning of the pivotal points of the several levers. The construction shown is one which has been found efficient for this purpose, the pivotal point of the clevis 6 with relation to the lever 8 being such as to properly divide the pressure. I thus provide a construction wherein without the use of any springs or compensating yielding members, but simply by the proper proportioning of the long and short arms of the various levers, a pull upon the brake-rod transmits a differential pressure to the large and small wheels. Such construction is efficient in attaining the desired results and has no parts which are likely to break or get out of order.

Having described my invention, what I claim as new, and desire to secure by Letters Patent, is—

1. In a brake mechanism for a truck, in combination with the usual brake-shoes and brake-beams, a lever pivotally mounted upon one of said beams, a lever connected to actuate the other of said beams and also connected to said first lever, and a member connected to said first lever between its center and the point of attachment of said second lever, which member is adapted to be actuated from the brake-rod.

2. In combination, in a maximum-traction truck, large wheels C, small wheels D, brake-beams 22 and 11, respectively, adapted to carry the brake-shoes for said wheels, the lever 16 pivoted to a point of support in connection with the truck-frame, a connecting-rod between said lever and brake-beam 22, the lever 8 mounted on brake-beam 11, lever 14 connecting said levers 8 and 16, a brake-rod and connections from said brake-rod whereby power is applied to the lever 8 between the center thereof and point of attachment of the lever 14 thereto, substantially as and for the purpose described.

3. In a maximum-traction truck, the combination with the usual large and small wheels and the frame, of the brake-beams 22 and 11 adapted to carry brake-shoes respectively for the large and small wheels, brake-rod 1 and means for actuating said rod, transverse bar 2 connected thereto, levers 3 connected to the ends of said bar 2 and pivotally mounted on cross-beam 5, couplings 6, levers 8 pivotally mounted upon the brake-beams 11, levers 16 pivoted upon the cross-beam 5, connecting-rods between said levers and brake-beams 22, and levers 14 connecting the ends of levers 8 and 16, substantially as described and for the purpose set forth.

4. In braking mechanism, in combination, a truck-frame, a plurality of pairs of wheels, a brake-beam corresponding to each pair, each beam being provided with shoes adapted to engage the corresponding wheels, a pair of levers pivotally connected with one of said brake-beams, a second pair of levers having a pivotal mounting in fixed relation to said truck-frame, connections between said first and second mentioned levers, connections between said second-mentioned pair of levers and another of said brake-beams, and means adapted to apply power to said first-mentioned pair of levers, said levers, connections, and brake-beams lying substantially within a single plane.

5. In braking mechanism, in combination, a plurality of pairs of wheels, a brake-beam corresponding to each of said pairs, each of said brake-beams being provided with shoes adapted to engage the corresponding wheels, a pair of levers connected with one of said brake-beams, a second pair of levers, connections between said first and second mentioned pairs of levers, connections between said second-mentioned pair of levers and another of said brake-beams, and brake-applying means connected with said first-mentioned levers at such points as to actuate said brake-beams with a force corresponding to the loads upon the corresponding wheels, said levers, brake-beams, and connections lying substantially within a single plane.

In testimony whereof I affix my signature in the presence of two witnesses.

BURTON R. STARE.

Witnesses:
FREDK. R. CASE,
JOHN K. BOSTWICK.